United States Patent
Hughes et al.

(10) Patent No.: US 10,513,987 B2
(45) Date of Patent: Dec. 24, 2019

(54) SYSTEM FOR DISSIPATING FUEL EGRESS IN FUEL SUPPLY CONDUIT ASSEMBLIES

(71) Applicant: General Electric Company, Schenectady, NY (US)

(72) Inventors: Michael John Hughes, State College, PA (US); Jayaprakash Natarajan, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 299 days.

(21) Appl. No.: 15/395,282

(22) Filed: Dec. 30, 2016

(65) Prior Publication Data

US 2018/0187607 A1 Jul. 5, 2018

(51) Int. Cl.
| F02C 9/26 | (2006.01) |
| F23R 3/34 | (2006.01) |
| F23R 3/00 | (2006.01) |
| F02C 7/22 | (2006.01) |

(52) U.S. Cl.
CPC ............... *F02C 9/26* (2013.01); *F02C 7/222* (2013.01); *F23R 3/002* (2013.01); *F23R 3/34* (2013.01); *F23R 3/346* (2013.01); *F05D 2220/32* (2013.01); *F05D 2240/35* (2013.01); *F23R 2900/00004* (2013.01)

(58) Field of Classification Search
CPC .. F02C 9/26; F02C 7/222; F23R 3/002; F23R 3/34; F23R 3/346
See application file for complete search history.

(56) References Cited

U.S. PATENT DOCUMENTS

| 5,640,851 A | 6/1997 | Toon et al. |
| 6,735,949 B1 * | 5/2004 | Haynes ................... F23R 3/283 |
| | | 60/746 |
| 7,878,000 B2 | 2/2011 | Mancini et al. |
| 8,113,001 B2 | 2/2012 | Singh et al. |
| 8,171,735 B2 | 5/2012 | Mancini et al. |

(Continued)

FOREIGN PATENT DOCUMENTS

EP 2 639 508 A2 9/2013

OTHER PUBLICATIONS

Extended European Search Report and Opinion issued in connection with corresponding EP Application No. 17198134.3 dated May 30, 2018.

*Primary Examiner* — Craig Kim
(74) *Attorney, Agent, or Firm* — Dority & Manning, P.A.

(57) ABSTRACT

A system for dissipating fuel egress includes a fuel injector and a fuel supply assembly. The fuel supply assembly has a fuel supply line that provides fuel and a purge air conduit arranged co-axially around the fuel supply line, thereby defining an annular channel around the fuel supply line. The fuel injector includes a perimeter body, a fuel injection port associated with the perimeter body, and an internal mixing chamber downstream of the fuel injection port in a direction of fuel flow. The fuel supply line provides fuel to the fuel injection port. The perimeter body of the fuel injector defines a fuel egress passage therethrough, which has an inlet in fluid communication with the annular channel and an outlet in fluid communication with the mixing chamber. A gas turbine combustor having an axial fuel staging (AFS) system with the present fuel egress dissipation system is also provided.

20 Claims, 7 Drawing Sheets

(56) References Cited

U.S. PATENT DOCUMENTS

| | | | |
|---|---|---|---|
| 8,387,391 | B2 | 3/2013 | Patel et al. |
| 8,438,856 | B2 | 5/2013 | Chila et al. |
| 8,590,311 | B2 | 11/2013 | Parsania et al. |
| 8,745,987 | B2 | 6/2014 | Stoia et al. |
| 8,769,955 | B2 * | 7/2014 | Van Nieuwenhuizen .................. F23R 3/346 60/737 |
| 8,863,525 | B2 | 10/2014 | Toronto et al. |
| 9,086,017 | B2 | 7/2015 | Twardochleb et al. |
| 9,267,436 | B2 | 2/2016 | Stoia et al. |
| 9,291,350 | B2 | 3/2016 | Melton et al. |
| 9,303,872 | B2 | 4/2016 | Hadley et al. |
| 9,316,155 | B2 | 4/2016 | DiCintio et al. |
| 9,316,396 | B2 | 4/2016 | DiCintio et al. |
| 9,322,556 | B2 | 4/2016 | Melton et al. |
| 9,360,217 | B2 | 6/2016 | DiCintio et al. |
| 9,376,961 | B2 | 6/2016 | Stoia et al. |
| 9,383,104 | B2 | 7/2016 | Melton et al. |
| 9,400,114 | B2 | 7/2016 | Melton et al. |
| 10,000,636 | B2 * | 6/2018 | Morizur ................ C08L 69/00 |
| 2010/0101229 | A1 | 4/2010 | York et al. |
| 2014/0260272 | A1 | 9/2014 | DiCintio et al. |
| 2014/0260280 | A1 | 9/2014 | Willis et al. |
| 2014/0260318 | A1 | 9/2014 | Willis et al. |
| 2014/0360193 | A1 | 12/2014 | Stoia et al. |
| 2015/0027126 | A1 * | 1/2015 | Berry ..................... F02C 7/222 60/739 |
| 2015/0285501 | A1 * | 10/2015 | DiCintio ................ F23R 3/14 60/740 |
| 2015/0285504 | A1 | 10/2015 | Melton |

\* cited by examiner

SYSTEM FOR DISSIPATING FUEL EGRESS IN FUEL SUPPLY CONDUIT ASSEMBLIES

STATEMENT OF GOVERNMENT RIGHTS

The invention disclosed herein was made with government support under contract number DE-FC26-05NT42643-ARRA, which was awarded by the United States Department of Energy (DOE) under the American Recovery and Reinvestment Act of 2009 (ARRA). The Government has certain rights in this invention.

TECHNICAL FIELD

The field of this disclosure relates generally to fuel supply conduits and, more particularly, to a system for dissipating fuel egress from a fuel supply conduit assembly for an axial fuel staging (AFS) system of a combustor assembly.

BACKGROUND

At least some known turbine assemblies include a compressor, a combustor, and a turbine. Gas flows into the compressor and is compressed. Compressed gas is then discharged into the combustor and mixed with fuel, and the resulting mixture is ignited to generate combustion gases. The combustion gases are channeled from the combustor through the turbine, thereby driving the turbine which, in turn, may power an electrical generator coupled to the turbine.

Many known turbine assemblies include a plurality of combustion cans, in which each combustion can employs a fuel system including a primary fuel nozzle at a forward end. In some known combustion cans, the combustion cans further include an axial fuel staging (AFS) system having a secondary fuel injector downstream of the primary fuel injector. Each combustion can includes a liner that defines a combustion chamber. The primary fuel nozzle injects fuel and compressed gas into a primary combustion zone within the combustion chamber, and the secondary fuel injector injects fuel and compressed gas into a secondary combustion zone within the combustion chamber downstream from the primary combustion zone.

Fuel for the secondary fuel injector is supplied by a fuel supply conduit coupled to the secondary fuel injector. However, because the fuel supply conduit is often positioned on an outer surface of the combustion can, the fuel supply conduit is susceptible to damage or dislocation, for example, during installation or maintenance. Additionally, if the conduit becomes damaged or dislocated, there is a possibility that the conduit may start leaking fuel.

BRIEF DESCRIPTION

In one aspect, a system for dissipating fuel egress includes a fuel injector and a fuel supply assembly. The fuel supply assembly has a fuel supply line that provides fuel and a purge air conduit arranged co-axially around the fuel supply line, thereby defining an annular channel around the fuel supply line. The fuel injector includes a perimeter body, a fuel injection port associated with the perimeter body, and an internal mixing chamber downstream of the fuel injection port in a direction of fuel flow. The fuel supply line provides fuel to the fuel injection port. The perimeter body of the fuel injector defines a fuel egress passage therethrough, which has an inlet in fluid communication with the annular channel and an outlet in fluid communication with the mixing chamber.

In another aspect, a gas turbine combustor having an axial fuel staging system with the present fuel egress dissipation system is also provided.

BRIEF DESCRIPTION OF THE DRAWINGS

These and other features, aspects, and advantages of the present embodiment will become better understood when the following detailed description is read with reference to the accompanying drawings, in which.

DETAILED DESCRIPTION

The written description uses examples to disclose various aspects and features of the present system for dissipating fuel egress within a fuel supply conduit. The written description, which includes a description of the best mode, is intended to enable any person skilled in the art to practice the improvements described herein, including making and using any devices and systems and performing any incorporated methods. The patentable scope of the improvements is defined by the claims and may include other examples that occur to those skilled in the art. Such other examples are intended to fall within the scope of the claims if they have structural elements that do not differ from the literal language of the claims or if they include equivalent structural elements with insubstantial differences from the literal language of the claims.

When introducing elements of various embodiments, the articles "a", "an", and "the" are intended to mean that there are one or more of the elements. The terms "comprising," "including," and "having" are intended to be inclusive and mean that there may be additional elements other than the listed elements.

As used herein, the terms "upstream" and "downstream" are directional terms used to describe the location of components relative to the flow of combustion products through the combustor from an upstream end to a downstream end. Upstream components are located on or toward the forward, or head, end of the combustor and are closer to the compressor section, while downstream components are located on or toward the aft end of the combustor and are closer to the turbine section.

Figure 1:
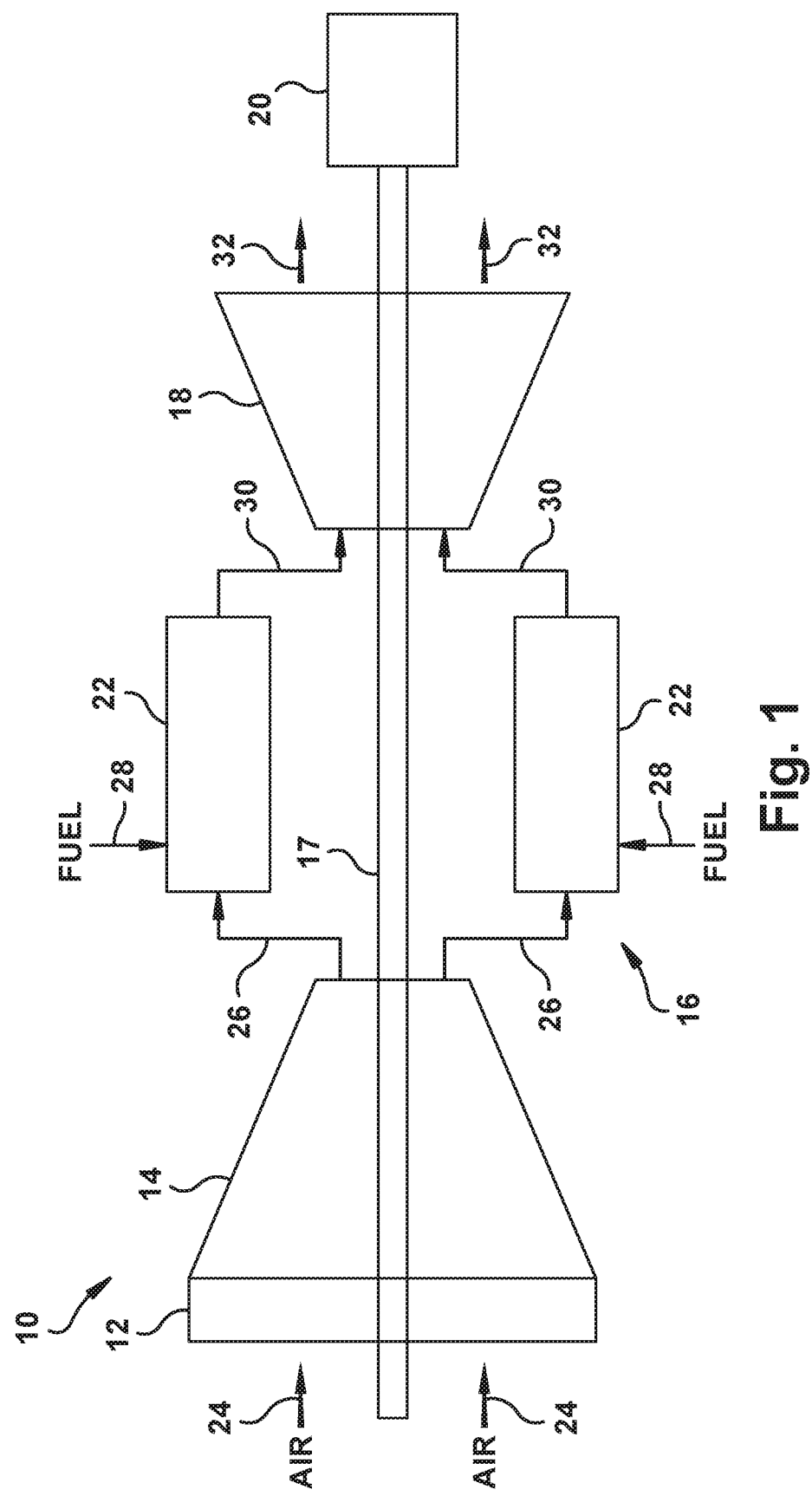
FIG. 1 is a schematic illustration of an exemplary turbine assembly.

FIG. 1 illustrates an exemplary turbine assembly 10. In the exemplary embodiment, turbine assembly 10 is a gas turbine assembly that includes a compressor section 14, a combustor section 16, and a turbine section 18 coupled in flow communication with one another within a casing 60 (shown in FIG. 2). The compressor section 14 and the turbine section 18 are joined by a rotor 17 that defines a centerline axis. In operation, a working gas 24 (such as air) flows into an inlet 12 of the compressor section 14 and is compressed. Compressed gas 26 is then channeled into the combustor section 16, such that compressed gas 26 is mixed with fuel 28 and ignited in the combustor section 16 to generate combustion gases 30. Combustion gases 30 are channeled through the turbine section 18 and then discharged from the gas turbine assembly 10 as exhaust 32. The rotation of blades within the turbine section 18 drives the rotor 17, which in turn drives the rotation of blades within the compressor section 14. In some embodiments, the rotor 17 may be further connected to a load 20, such as a generator, for producing electricity.

In the exemplary embodiment, the combustor section 16 has a plurality of spaced-apart combustion cans 22 that are arranged circumferentially around the rotor 17. While FIG. 1 shows only two such cans 22, it should be understood that any number of combustion cans 22 may be employed, including by way of example and not limitation, 6, 8, 10, 12, 14, or 16 combustion cans.

Figure 2:
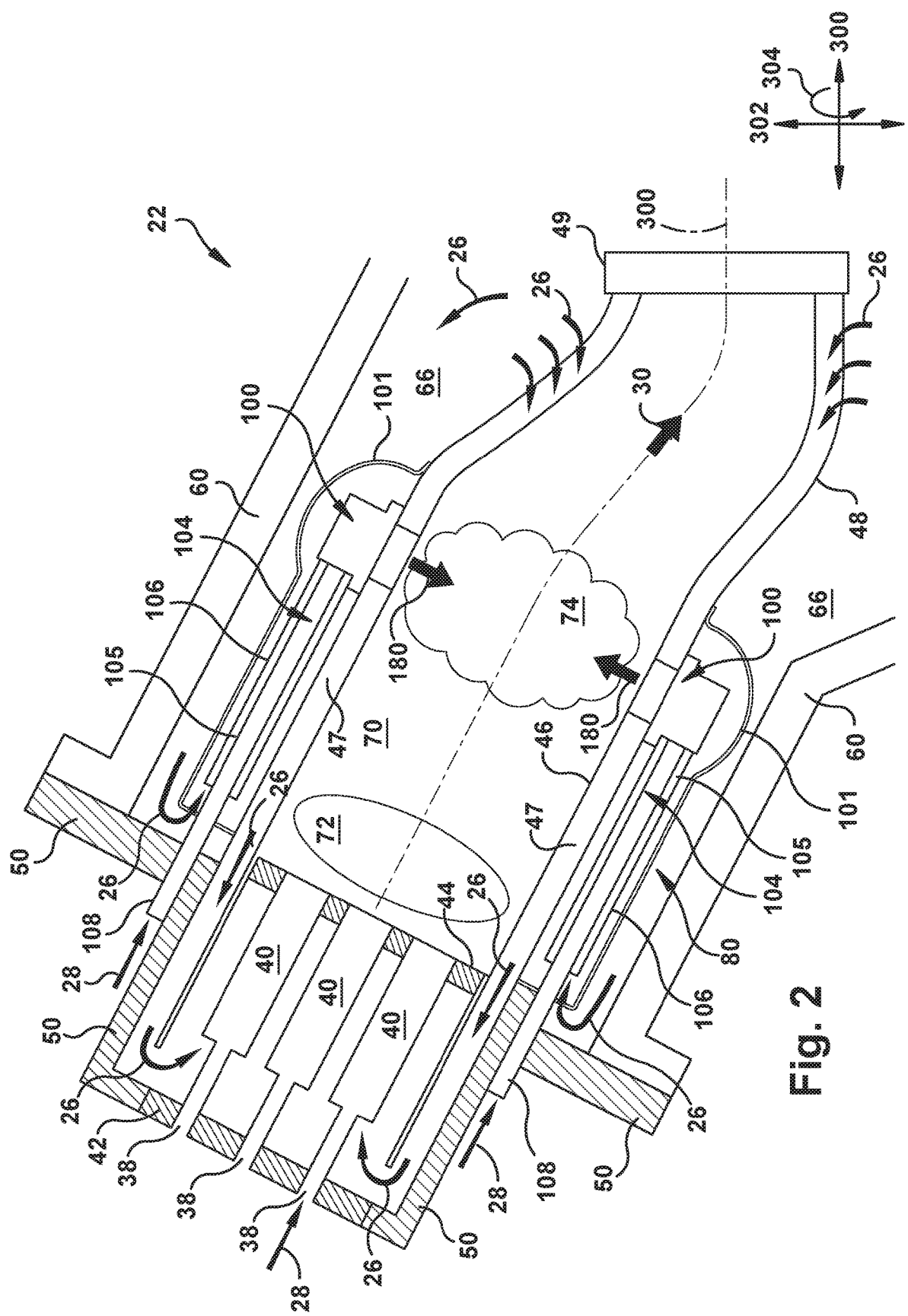
FIG. 2 is a schematic illustration of an exemplary AFS system for use with a combustor of the turbine assembly shown in FIG. 1.

FIG. 2 illustrates a combustion can 22 having an exemplary AFS system 80, as discussed further herein. The combustion can 22 includes a liner 46 that defines a combustion chamber 70. The liner 46 may be positioned within (i.e., circumferentially surrounded by) an outer sleeve 48, such that an annulus 47 is formed therebetween. One or more primary fuel nozzles 40 are positioned at the forward end of the combustion can 22. Fuel 28 is directed through fuel supply lines 38, which extend through an end cover 42, and into the primary fuel nozzles 40. The primary fuel nozzles 40 convey the fuel 28 and compressed air 26 into a primary combustion zone 72, where combustion occurs. In some embodiments, the fuel 28 and compressed air 26 are combined as a mixture prior to reaching the primary combustion zone 72.

The primary fuel nozzles 40 are positioned within a forward casing 50 that defines a forward end of the combustor. The aft, or downstream ends, of the primary fuel nozzles 40 extend through a cap 44 that defines the upstream end of the combustion chamber 70. The forward casing 50 is connected to an outer casing 60, sometimes referred to as a compressor discharge casing 60, which defines a high pressure air plenum 66 around the liner 46 and the outer sleeve 48. Compressed air 26 from the compressor section 14 travels through the plenum 66 and enters the combustion can 22 via apertures (not shown) in the downstream end of the outer sleeve 48 (as indicated by arrows 26 near an aft frame 49). Air flows 26 travel upstream through the annulus 47 and are turned by the end cover 42 to enter the primary fuel nozzles 40 and to cool the head end.

Figure 5:
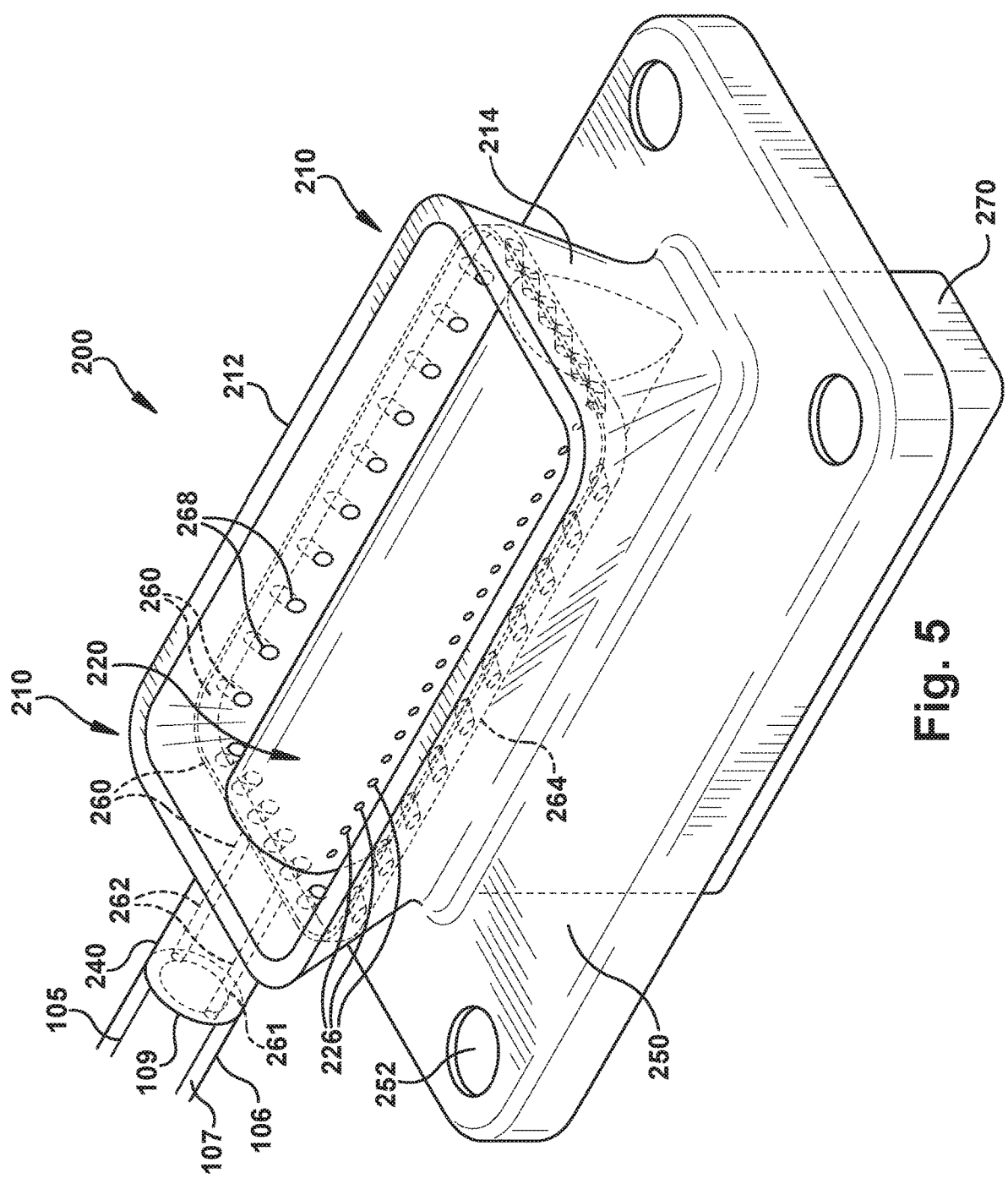
FIG. 5 is a perspective view of an alternate secondary (AFS) fuel injector, according to another aspect of the present disclosure.
Figure 6:
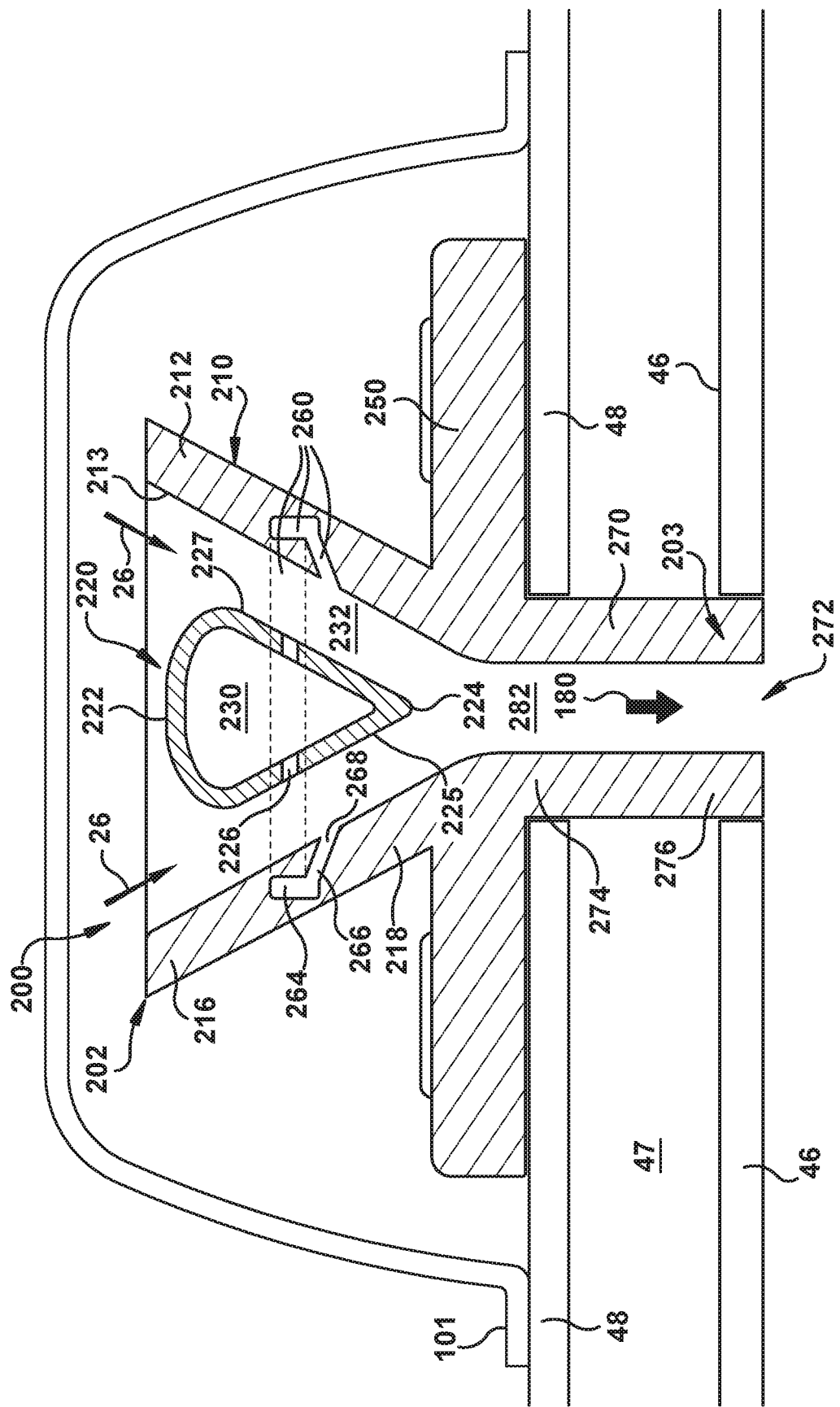
FIG. 6 is a schematic cross-sectional illustration of the alternate secondary (AFS) fuel injector of FIG. 5, in which the cross-section is taken along a radial plane of the injector.
Figure 7:
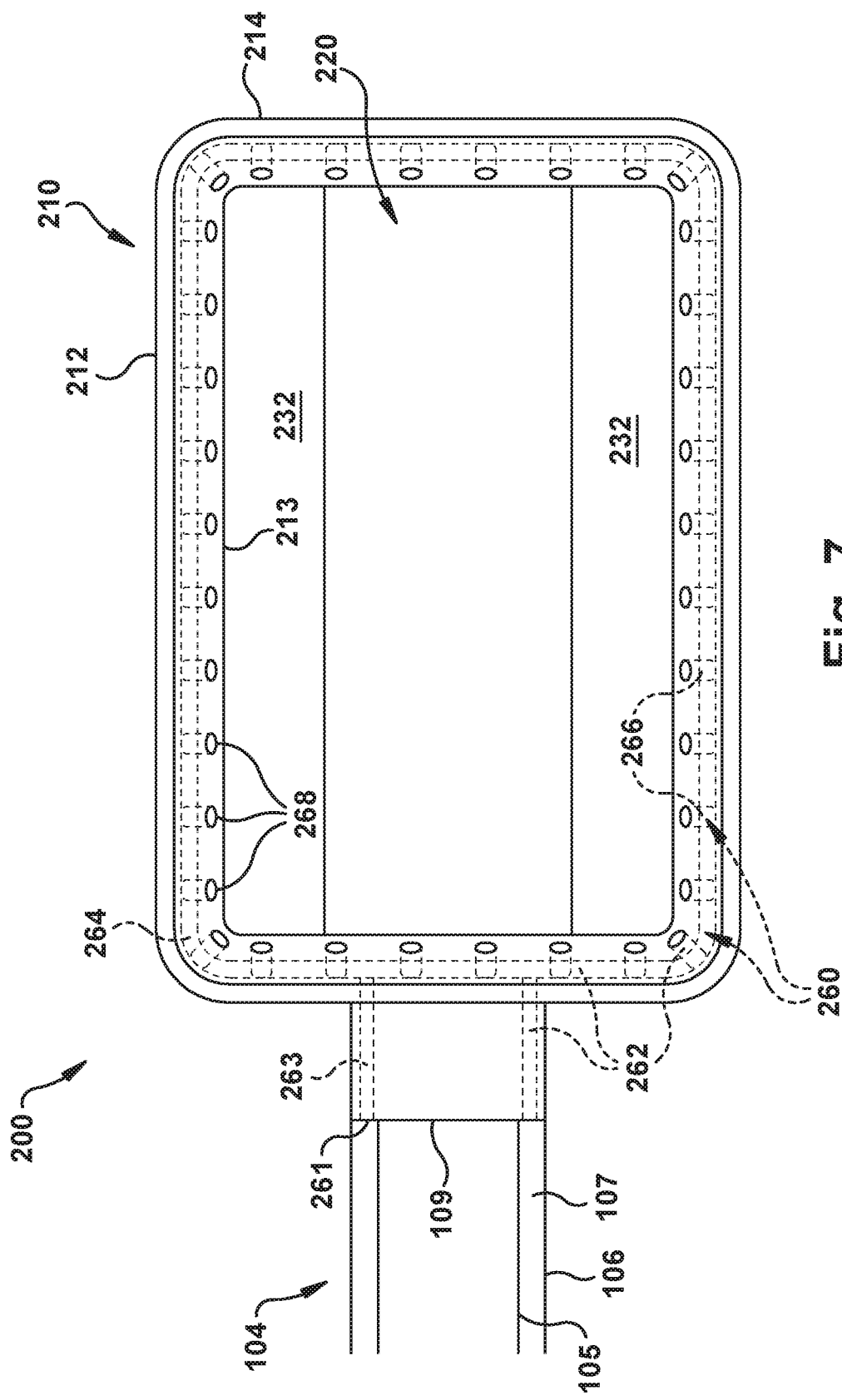
FIG. 7 is a schematic overhead plan view of the alternate secondary (AFS) fuel injector of FIG. 5, the AFS fuel injector defining an internal cavity and a plurality of outlets for dissipating fuel egress, omitting the mounting flange for clarity.

In the exemplary embodiment, an axial fuel staging (AFS) system 80 is provided to deliver a second fuel/air mixture to a secondary combustion zone 74, which is axially downstream of the primary combustion zone 72. The AFS system 80 includes one or more fuel injectors 100 (or 200, as shown in FIGS. 5-7) coupled to the liner 46 and/or the outer sleeve 48, such that each injector 100 introduces the second fuel/air mixture as a jet entering a cross-flow of the combustion products (30) produced in the primary combustion zone 72. The second fuel/air mixture(s) are ignited by the combustion products from the primary combustion zone 72 and burn in the secondary combustion zone 74. In addition to the fuel injectors 100, the AFS system 80 further includes protective housings 101 and fuel supply assemblies 104 corresponding in number to the number of fuel injectors 100.

Figure 3:
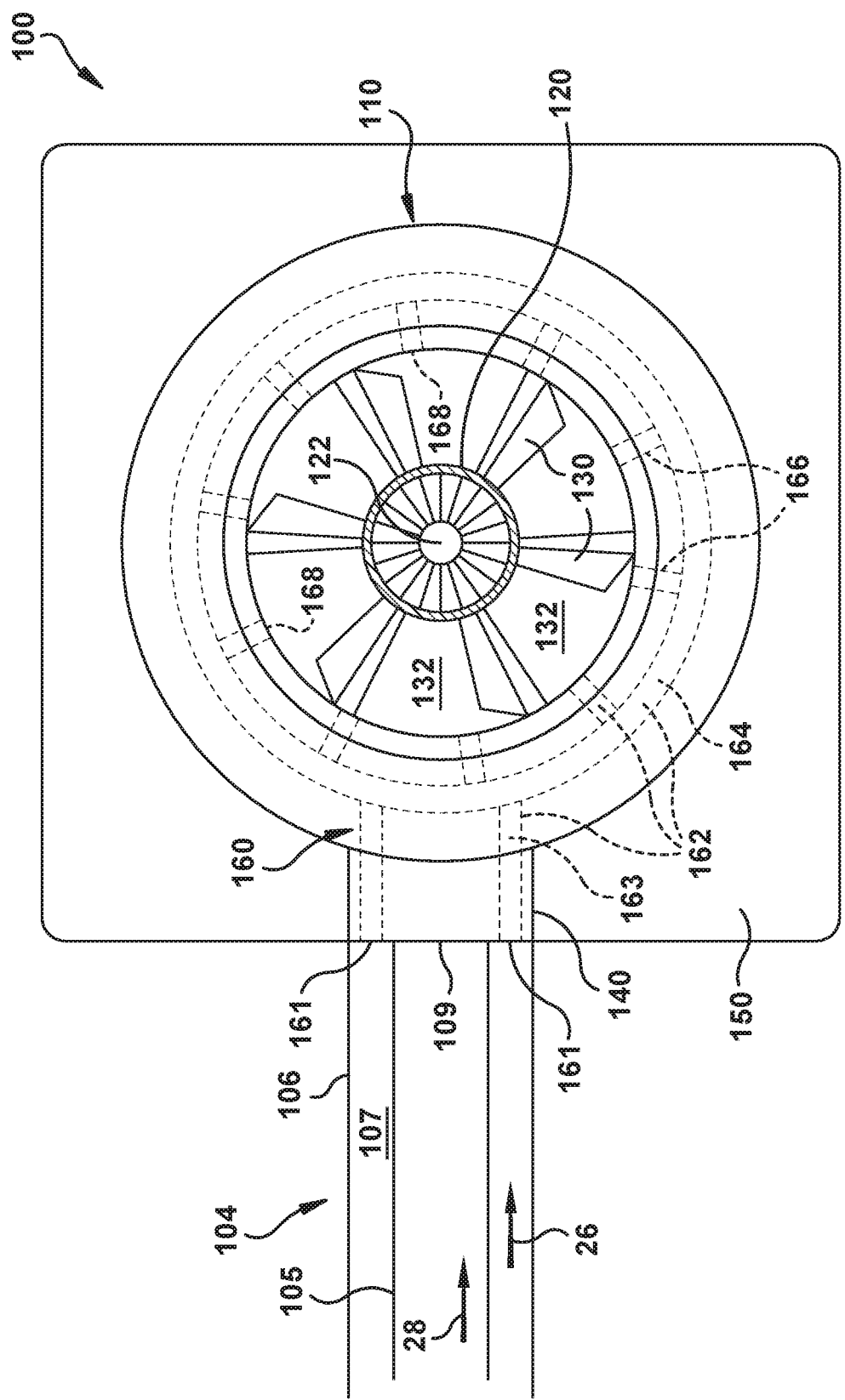
FIG. 3 is a schematic overhead plan view of a secondary (AFS) fuel injector according to one aspect of the present disclosure, the AFS fuel injector defining an internal cavity and a plurality of outlets for dissipating fuel egress.
Figure 4:
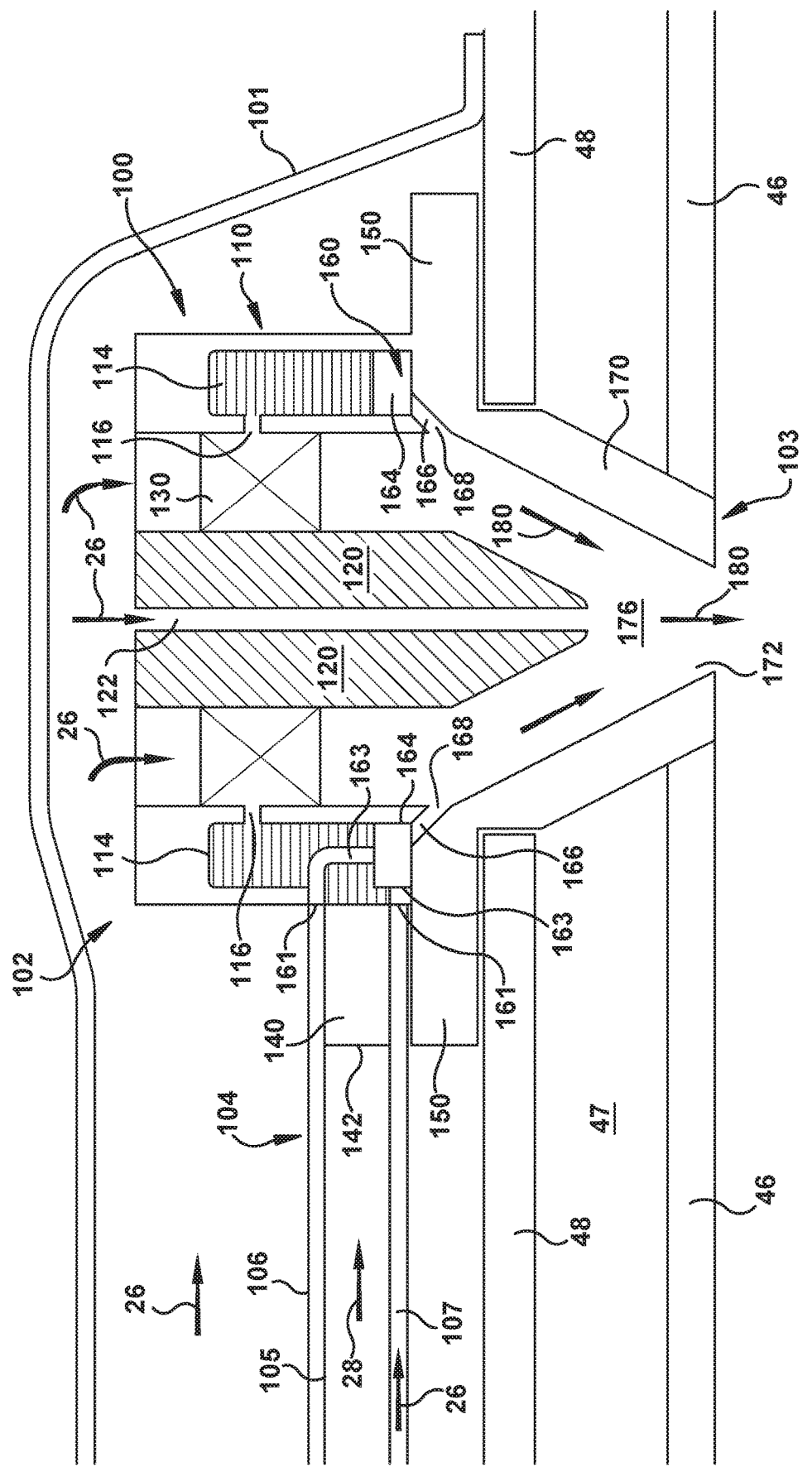
FIG. 4 is a schematic cross-sectional illustration of the secondary (AFS) fuel injector of FIG. 3 as installed in a combustor, in which the cross-section is taken along a longitudinal axis of the combustor.

For convenience in the description of the operation of the AFS system, reference may be made to fuel injector 100 (as shown in FIGS. 3-4). However, it should be understood that the fuel injector 200 (as shown in FIGS. 5-7) may be used in place of the fuel injector 100.

The protective housings 101 at least partially surround, and are located radially outward of, the fuel injectors 100 and the fuel supply assemblies 104 to create protective environments around the injectors 100 and the fuel supply assemblies 104. The protective housings 101 protect the fuel supply assembly 104 from damage or dislocation, as may occur during the handling, installation, or maintenance of the combustion can 22. The protective housings 101 may be secured to the outer surface of the outer sleeve 48 by mechanical fasteners or by welding or other joining techniques. Alternately, or additionally, the protective housing 101 may be secured to the fuel injector 100.

For convenience, reference may be made herein to a single and exemplary secondary fuel injector 100 as part of the present AFS system 80. However, it should be appreciated that the combustion can 22 may be provided with more than one of the secondary fuel injectors 100 (each with its own fuel supply assembly 104 and protective housing 101), as needs dictate. Such secondary fuel injectors 100 may or may not be uniformly spaced around the circumference of the outer sleeve 48, and may or may not be located within a single axial plane. For instance, the number of fuel injectors 100 may be two, three, four, five, or more. It is contemplated that in embodiments having higher numbers of fuel injectors 100, the number of fuel supply assembly 104 and/or the number of protective housings 101 may be reduced, for example, by modifying these features to service more than one fuel injector 100.

The combustion chamber 70 has a longitudinal flow axis 300, such that the liner 46 has a radial dimension 302 and a circumferential dimension 304 relative to the flow axis 300. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

In the exemplary embodiment, the liner 46 is surrounded by an outer sleeve 48, thereby forming the annulus 47 therebetween through which air 26 flows to the head end of the combustor. Heat is transferred convectively from the liner 46 to the air 26, thus cooling the liner 46 and warming the air 26. The liner 46 may be formed with an upstream liner component and a downstream transition component. The liner component may be generally cylindrical, while the transition component may taper from a cylindrical forward end to a generally rectangular aft end.

In embodiments in which the liner component and the transition component are separate parts, the liner component has a forward end and an aft end, and the transition component also has a forward end and an aft end. The liner component forward end circumscribes the primary fuel nozzles 40. The liner component aft end is coupled to transition component forward end, where the transition component forward end circumscribes liner component aft end, often with a seal therebetween. The transition component aft end is coupled to a turbine nozzle of the turbine section 18. As such, the liner 46 defines the combustion chamber 70, which extends from the cap 44 holding the primary fuel injector 40 to the aft frame 49.

In other embodiments, the liner component and the transition component may be integrally formed together in any suitable manner that permits the AFS system 80 to function as described herein. In such embodiments, the liner 46 is formed as a "unibody" that extends from the cap 44 to the aft frame 49, thereby eliminating the joint between separate liner and transition components and reducing part count per combustion can 22.

As shown, the outer sleeve 48 is constructed as a single component that surrounds the liner 46 with the forward end being coupled to the forward casing 50. However, in other embodiments, the outer sleeve 48 may include an upstream flow sleeve and a downstream impingement sleeve. In such embodiments, the flow sleeve component has a forward end and an aft end, and the impingement sleeve component also has a forward end and an aft end. The forward end of the flow sleeve component is coupled to a flange of the forward casing 50. The aft end of the flow sleeve component is coupled to the forward end of the impingement sleeve component with the forward end of the impingement sleeve component circumscribing the aft end of the flow sleeve. The impingement sleeve component is coupled to the liner 46 (or, in some embodiments, the transition component of the liner 46), either via the aft frame 49 or via bosses (not shown) that support the AFS fuel injectors 100.

The AFS fuel injector 100 is coupled to the outer sleeve 48 and extends through the outer sleeve 48 and the liner 46. In one embodiment, a boss (not shown) supporting the fuel injector 100 functions as a fastener for securing the outer sleeve 48 to the liner 46. In other embodiments, the AFS fuel injector 100 may be coupled to the outer sleeve 48 in any suitable manner, and the outer sleeve 48 may have any suitable number of components coupled between the flange of the forward casing 50 and the turbine nozzle in any suitable manner that permits the AFS system 80 to function as described herein.

During operation of the combustion can 22, fuel 28 and compressed gas 26 are supplied to the primary fuel nozzle(s) 40, mixed together, and injected into the combustion chamber 70 as a first fuel/air mixture. The first fuel/air mixture is combusted in the primary (upstream) combustion zone. Similarly, fuel 28 is supplied to the AFS fuel injector 100 via a fuel supply assembly 104, having an internal fuel supply tube 105 surrounded by a purge air tube 106 (shown in more detail in FIG. 3). The internal fuel supply tube 105 and/or the purge air tube 106 may have any suitable cross-sectional shape (e.g., the tubes 105, 106 may have round cross-sections in some embodiments or elliptical cross-sections in other embodiments). The fuel supply assembly 104 extends from the forward casing 50 to the fuel injector 100 in a generally axial direction radially outward of the outer sleeve 48. A spacer, such as a mesh screen, a spring, a wire, or a fabricated device such as is described in commonly assigned U.S. patent application Ser. No. 15/061,369, may be used to maintain a concentric relationship between the fuel supply tube 105 and the purge air tube 106.

The purge air tube 106 has an inlet end (shown in FIG. 2 as receiving a stream of compressed air 26) and a discharge end (shown in FIG. 3 as fluidly connected to inlets 161 of a fuel egress passage 162, described below). The inlet end of the purge air tube 106 is positioned radially inward of the protective housing 101. Because the purge air tube 106 is wholly contained within the protective housing 101 and because most of the length of the fuel supply tube 105 is housed within one or both of the purge air tube 106 and the protective housing 101, the likelihood of dislocation of or damage to the fuel supply assembly 104 is minimized. The protective housing 101 has an open forward end (i.e., the end opposite the fuel injector 100) through which air 26 flows into the protective environment and, from there, into the fuel injector 100. A relatively small stream of compressed air 26 (relatively small in comparison to the volume of compressed air 26 flowing to the injector 100) enters the inlet end of the purge air tube 106.

Fuel 28 enters through the inlet 108 of the fuel supply tube 105, which may extend through and/or may be coupled to the forward casing 50 (specifically, the casing flange) or to some other convenient location. The AFS fuel injector 100 mixes fuel 28 with compressed air 26 and injects the second fuel/air mixture into combustion chamber 70 at the secondary (downstream) combustion zone 74. The first fuel/air mixture and second fuel/air mixture are ignited inside combustion chamber 70 to generate a flow of combustion gases 30 that are channeled to the turbine section 18.

The AFS fuel injector 100 may have a round profile with a center body and swirl vanes disposed between the center body and the perimeter body, as shown in FIGS. 3 and 4. Alternately, the AFS fuel injector 200 may be an oblong ("slot") injector having a shape that tapers from an inlet having a generally rectangular shape to an outlet having a racetrack shape and including one or more centrally located fuel injection bodies, as shown in FIGS. 5, 6, and 7. The illustrated fuel injectors 100, 200 are merely representative of the types of fuel injectors that benefit from the present fuel dissipation system. It is contemplated herein that the present fuel dissipation system may be applied to many types of fuel injectors in addition to those shown.

Turning now to FIGS. 3 and 4, a fuel injector 100 includes a perimeter body 110 that has a generally round profile and that circumscribes a center body 120. The center body 120 may optionally be provided with a supplemental air channel 122 therethrough. A number of swirl vanes 130 extends between the center body 120 and the perimeter body 110. Air flow passages 132 are defined between adjacent swirl vanes 130. The perimeter body 110 is surrounded by, coupled to, and extends radially from a mounting flange 150. The mounting flange 150 is further coupled to an outlet portion 170 of the fuel injector 100, such that the outlet portion extends radially inwardly from the mounting flange (that is, the outlet portion 170 extends in a direction opposite the perimeter body 110). The mounting flange 150 is attached to the outer sleeve 48 of the combustion can 22.

Fuel 28 is introduced through an inlet conduit 140, which couples to the fuel supply assembly 104 at a connection joint 142. As shown in FIG. 4 and mentioned above, the fuel supply assembly 104 includes the internal fuel supply tube 105 surrounded by the purge air tube 106 in a co-axial relationship, such that an annular channel 107 is formed within the purge air tube 106. Fuel 28 flows through the fuel supply tube 105 from a forward inlet 108 to an aft outlet 109, through the inlet conduit 140 of the injector 100, and into a fuel plenum 114 defined within the perimeter body 110. A number of fuel injection ports 116 delivers the fuel 28 through the swirl vanes 130, into the air flow passages 132 defined between adjacent swirl vanes 130 (as shown), or both.

Streams of compressed air 26 travel axially through the protective housing 101 that covers the fuel supply assembly 104 and the fuel injector 100. (In other embodiments, the protective housing may be provided with apertures radially outward of the injector 100, such that air 26 may flow radially into the injector 100). The streams of compressed air 26 radially enter an inlet end 102 of the fuel injector 100, where the fuel 28 is introduced, as described above. The fuel 28 and the compressed air 26 are mixed in an annular mixing chamber 176 downstream of the fuel injection ports 116, and the resulting fuel/air mixture 180 is directed through an outlet port 172 at an outlet end 103 of the fuel injector 100. The supplemental air channel 122 delivers a supplemental air stream to push the fuel/air mixture 180 away from the center body 120 and toward the outlet port 172. The outlet end 103 including the outlet port 172 fits within, or through, a corresponding opening in the liner 46.

FIGS. 3 and 4 further illustrate a fuel egress dissipation system 160 for dissipating fuel egress within the fuel supply assembly 104. The fuel egress dissipation system 160 includes a fuel egress passage 162 having an inlet 161 in fluid communication with the annular channel 107 and an outlet 168 in fluid communication with the mixing chamber 176. The outlet 168 is downstream of the fuel injection ports 116 relative to the flow of air 26 through the injector 100. In one embodiment, the perimeter body 110 further defines a fuel purge cavity 164, which is downstream of the fuel plenum 114 relative to the flow of air 26 through the injector 100. The fuel purge cavity 164 is located between the inlet 161 and the outlet 168 of the fuel egress passage 162. In such embodiments with a fuel purge cavity 164, the fuel egress passage 162 includes a first portion 163 upstream of the fuel purge cavity 164 and a second portion 166 downstream of the fuel purge cavity 164. The first (upstream) portion 163 includes the inlet 161, and the second (downstream) portion 166 includes the outlet 166.

The fuel purge cavity 164 may be defined as an annular cavity within the circumference of the perimeter body 110. While a relatively small number of upstream portions 163 of the fuel egress passage 162 may feed the fuel purge cavity 164, a larger number of downstream portions 166 of the fuel egress passage 162 may extend from the fuel purge cavity 164 to a corresponding number of outlets 168. Thus, it is contemplated that a plurality of outlets 168 may be spaced around an interior surface of the perimeter body 110 to accommodate any volume of fuel egress that may arise during operation of the fuel injector 100. Each of the outlets 168 is located downstream of the fuel injection ports 116 with the outlets 168 being arranged in one or more planes.

In the event of fuel egress from the fuel supply line 105, fuel 28 is carried into the annular channel 107 within the purge air conduit 106. Compressed air 26 flowing through the annular channel 107 carries the egressed fuel to the inlet 161 of the fuel egress passage 162. In the illustrated embodiment, the egressed fuel is transported through a first portion 163 of the fuel egress passage 162 to the fuel purge cavity 164 within which cavity 164 the egressed fuel is spread around the circumference of the perimeter body 110. From the cavity 164, the egressed fuel flows through the second portion 166 of the fuel egress passage 162 to the outlets 168 positioned around the interior surface of the perimeter body 110. The outlets 168 are positioned between the fuel injection ports 116 and the outlet 172 of the injector 100.

FIGS. 5, 6, and 7 illustrate an alternate AFS fuel injector 200. The AFS injector 200 may be described as an oblong ("slot") injector having a shape that tapers from an inlet having a generally rectangular shape to an outlet having a racetrack shape and including one or more centrally located fuel injection bodies.

The AFS injector 200 includes a perimeter body 210, or frame, which defines a generally rectangular shape of the inlet 202 of the injector 200. The body 210 includes a first pair of oppositely disposed side walls 212 and a second pair of oppositely disposed end walls 214, in alternating relationship. The side walls 212 are longer than the end walls 214. The side walls 212 are connected to, or integrated seamlessly with, a mounting flange 250, such that the perimeter body 210 extends radially from the mounting flange 250 in a first direction away from the longitudinal axis 300 of the combustion can 22. The side walls 212 have a first end 216 distal from the mounting flange 250 and a second end 218 proximate to the mounting flange 250. The side walls 212 and, optionally, the end walls 214 are angled relative to the mounting flange 250, thereby providing the perimeter body 210 with a tapering shape from the inlet 202 to the mounting flange 250.

One or more center bodies 220 are provided within the perimeter body 210, a single center body 220 being shown in FIGS. 5 and 6. The center body 220 defines an internal fuel plenum 230, which is in fluid communication with an inlet conduit 240. The center body 220 may have the shape of an inverted teardrop having a leading edge 222, a trailing edge 224 opposite the leading edge 222, and a pair of oppositely disposed fuel injection surfaces 225, 227 extending between the leading edge 222 and the trailing edge 224. The fuel injection surfaces 225 and/or 227 define therethrough a plurality of fuel injection ports 226, which are in fluid communication with the fuel plenum 230.

Fuel 28 is introduced through the inlet conduit 240, which couples to the fuel supply assembly 104. As shown in FIG. 5 and mentioned above, the fuel supply assembly 104 includes the internal fuel supply tube 105 surrounded by the purge air tube 106 in a co-axial relationship, such that an annular channel 107 is formed within the purge air tube 106. Fuel 28 flows through the fuel supply tube 105 from a forward inlet 108 (as shown in FIG. 2) to an aft outlet 109, through the inlet conduit 240 of the injector 200, and into a fuel plenum 230 defined within the center body 220. The fuel injection ports 226 deliver the fuel 28 from the center body 220 into air flow passages 232 defined between the center body 220 and the interior surfaces 213 of the side walls 212.

Streams of compressed air 26 travel axially through the protective housing 101 that covers the fuel supply assembly 104 and the fuel injector 200. (In other embodiments, the protective housing may be provided with apertures radially outward of the injector 200, such that air 26 may flow radially into the injector 200). The streams of compressed air 26 radially enter an inlet end 202 of the fuel injector 200, where the fuel 28 is introduced, as described above. The fuel 28 and the compressed air 26 are mixed in a mixing chamber 282 downstream of the fuel injection ports 226, and the resulting fuel/air mixture 180 is directed through an outlet port 272 at an outlet end 203 of the outlet portion 270 of the fuel injector 200. The outlet end 203 of the outlet portion 270, which includes the outlet port 272, fits within or through a corresponding opening in the liner 46. The outlet portion 270 of the injector 200 has a cross-section in the shape of a slot or racetrack and defines a uniform cross-section from a first end 274 proximate the mounting flange 250 to a second end 276 distal to the mounting flange 250. The outlet portion 270 may be produced integrally (seamlessly) with the mounting flange 250 and/or the mounting flange 250 and the perimeter body 210, or the outlet portion 270 may be produced separately from the mounting flange 250 and subsequently joined thereto.

FIGS. 5, 6, and 7 further illustrate a fuel egress dissipation system 260 for dissipating fuel egress within the fuel supply assembly 104. The fuel egress dissipation system 260 includes a fuel egress passage 262 having an inlet 261 in fluid communication with the annular channel 107 and an outlet 268 in fluid communication with the mixing chamber 282. The outlet 268 is downstream of the fuel injection ports 226 relative to the flow of air 26 through the injector 200. In one embodiment, the perimeter body 210 further defines a fuel purge cavity 264, which is downstream of the fuel injection ports 226 relative to the flow of air 26 through the injector 100. The fuel purge cavity 264 is located between the inlet 261 and the outlet 268 of the fuel egress passage 262. In such embodiments with the fuel purge cavity 264, the fuel egress passage 262 includes a first portion 263 upstream of the fuel purge cavity 264 and a second portion 266 downstream of the fuel purge cavity 264, in this case "upstream" and "downstream" being relative to the flow of egressed fuel. The first (upstream) portion 263 includes the inlet 261, and the second (downstream) portion 266 includes the outlet 268.

The fuel purge cavity 264 may be defined as an annular cavity within the circumference of the perimeter body 210. While a relatively small number of upstream portions 263 of the fuel egress passage 262 may feed the fuel purge cavity 264, a larger number of downstream portions 266 of the fuel egress passage 262 may extend from the fuel purge cavity 264 to a corresponding number of outlets 268. Thus, it is contemplated that a plurality of outlets 268 may be spaced around an interior surface 213 of the perimeter body 210 to accommodate any volume of fuel egress that may arise during operation of the fuel injector 200. Each of the outlets 268 is located downstream of the fuel injection ports 226 (relative to the flow of air 26 through the fuel injector 200) with the outlets 268 being arranged in one or more planes.

In the event of fuel egress from the fuel supply line 105, fuel 28 is carried into the annular channel 107 within the purge air conduit 106. Compressed air 26 flowing through the annular channel 107 carries the egressed fuel to the inlet 261 of the fuel egress passage 262. In the illustrated embodiment, the egressed fuel is transported through a first portion 263 of the fuel egress passage 262 to the fuel purge cavity 264 within which cavity 264 the egressed fuel is spread around the circumference of the perimeter body 210. From the cavity 264, the egressed fuel flows through the second portion 266 of the fuel egress passage 262 to the outlets 268 positioned around the interior surface 213 of the perimeter body 210. The outlets 268 are positioned between the fuel injection ports 226 and the outlet 272 of the injector 200.

The methods and systems described herein provide a fuel egress dissipation system for an AFS system of a gas turbine combustor. Moreover, the methods and systems provide a system that safely dissipates fuel egress from a fuel supply line by directing the fuel through passages within the perimeter body of the AFS injector. Moreover, the methods and systems facilitate flush the fuel egress into and through the fuel injector of the AFS system, so that the fuel may be incorporated with the second fuel-air mixture and combusted within the combustion chamber. Therefore, the methods and systems enable the AFS system to operate more effectively.

Exemplary embodiments of methods and systems are described above in detail. In the exemplary embodiments, the methods and systems are described in connection with a can annular combustion system. However, it should be understood that these methods and systems are applicable to other combustion systems, including (a) annular combustion systems having an inner liner and an outer liner and (b) combustion systems in which the combustor liner is integrated with the first-stage turbine nozzle. Thus, the methods and systems described herein are not limited to the specific embodiments described herein, but rather, components of the methods and systems may be utilized independently and separately from other components described herein. For example, the methods and systems described herein may have other applications not limited to practice with turbine assemblies, as described herein. Rather, the methods and systems described herein can be implemented and utilized in connection with various other industries.

While the invention has been described in terms of various specific embodiments, those skilled in the art will recognize that the invention can be practiced with modification within the spirit and scope of the claims.

What is claimed is:

1. A system for dissipating fuel egress, the system comprising:
   a fuel supply assembly having a fuel supply line providing fuel and a purge air conduit arranged co-axially around the fuel supply line, thereby defining an annular channel around the fuel supply line;
   a fuel injector for a combustor, the fuel injector including a perimeter body defining a portion of the fuel injector, a fuel injection port associated with the perimeter body, and an internal mixing chamber downstream of the fuel injection port in a direction of fuel flow;
   wherein the fuel supply line provides fuel to the fuel injection port; and
   wherein the perimeter body of the fuel injector defines a fuel egress passage therethrough, the fuel egress passage having an inlet in fluid communication with the annular channel and an outlet in fluid communication with the mixing chamber, the fuel egress passage further comprising a fuel purge cavity between the inlet and the outlet, the fuel purge cavity being defined as an annular cavity within a circumference of the perimeter body.

2. The system of claim 1, wherein the outlet of the fuel egress passage is downstream of the fuel injection port.

3. The system of claim 1, wherein the fuel egress passage includes a first portion upstream of the fuel purge cavity and a second portion downstream of the fuel purge cavity, the first portion including the inlet and the second portion including the outlet.

4. The system of claim 1, wherein a plurality of outlets extends from the fuel purge cavity, each of the plurality of outlets being downstream of the fuel injection port.

5. The system of claim 1, further comprising a protective housing positioned radially outward of the purge air conduit and the fuel injector.

6. The system of claim 1, wherein the fuel injector further comprises a center body located radially inward of the perimeter body.

7. The system of claim 5, wherein the fuel injector further comprises a plurality of swirl vanes disposed between the center body and the perimeter body.

8. The system of claim 5, wherein the center body defines a fuel plenum therein, the fuel plenum being in fluid communication with the fuel supply line and the fuel injection port being defined through the center body.

9. The system of claim 1, wherein the inlet is a plurality of inlets and the outlet is a plurality of outlets, wherein the fuel egress passage comprises a plurality of upstream portions and a plurality of downstream portions, each of the plurality of upstream portions including one of the plurality of inlets, each of the plurality of downstream portions including one of the plurality of outlets, and wherein the fuel purge cavity is between the plurality of upstream portions and the plurality of downstream portions.

10. The system of claim 9, wherein the number of downstream portions is greater than the number of upstream portions.

11. The system of claim 9, wherein the plurality of outlets is spaced around an interior surface of the perimeter body.

12. A gas turbine combustor comprising:
an axial fuel staging (AFS) system comprising:
a fuel supply assembly having a fuel supply line providing fuel and a purge air conduit arranged co-axially around the fuel supply line, thereby defining an annular channel around the fuel supply line;
a fuel injector for a combustor, the fuel injector including a perimeter body defining a portion of the fuel injector, a fuel injection port associated with the perimeter body, and an internal mixing chamber downstream of the fuel injection port in a direction of fuel flow;
wherein the fuel supply line provides fuel to the fuel injection port; and
wherein the perimeter body of the fuel injector defines a fuel egress passage therethrough, the fuel egress passage having an inlet in fluid communication with the annular channel and an outlet in fluid communication with the mixing chamber, the fuel egress passage further comprising a fuel purge cavity between the inlet and the outlet, the fuel purge cavity being defined as an annular cavity within a circumference of the perimeter body.

13. The gas turbine combustor of claim 12, further comprising a liner having a forward end and an aft end and defining therebetween a combustion chamber, the fuel injector being located along the liner between the forward end and the aft end to inject fuel in a radial direction into the combustion chamber relative to a longitudinal axis of the combustor.

14. The gas turbine combustor of claim 13, wherein the fuel injector is one of a plurality of fuel injectors located along the liner, each of the plurality of fuel injectors having a respective fuel supply assembly.

15. The gas turbine combustor of claim 12, wherein the outlet of the fuel egress passage is downstream of the fuel injection port.

16. The gas turbine combustor of claim 12, wherein the fuel egress passage includes a first portion upstream of the fuel purge cavity and a second portion downstream of the fuel purge cavity, the first portion including the inlet and the second portion including the outlet.

17. The gas turbine combustor of claim 12, wherein a plurality of outlets extends from the fuel purge cavity, each of the plurality of outlets being downstream of the fuel injection port.

18. The gas turbine combustor of claim 12, wherein the fuel injector further comprises a center body located radially inward of the perimeter body.

19. The gas turbine combustor of claim 18, wherein the fuel injector further comprises a plurality of swirl vanes disposed between the center body and the perimeter body.

20. The gas turbine combustor of claim 18, wherein the center body defines a fuel plenum therein, the fuel plenum being in fluid communication with the fuel supply line and the fuel injection port being defined through the center body.

* * * * *